United States Patent
Suzuki et al.

(10) Patent No.: US 11,973,439 B2
(45) Date of Patent: Apr. 30, 2024

(54) CONTROL DEVICE AND CONTROL METHOD FOR POWER CONVERSION DEVICE

(71) Applicant: MEIDENSHA CORPORATION, Tokyo (JP)

(72) Inventors: Tetsuji Suzuki, Inazawa (JP); Yoshihito Kumamoto, Ichinomiya (JP); Takanori Wakamatsu, Kiyosu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/275,734

(22) PCT Filed: Jan. 6, 2022

(86) PCT No.: PCT/JP2022/000247
§ 371 (c)(1),
(2) Date: Aug. 3, 2023

(87) PCT Pub. No.: WO2022/168524
PCT Pub. Date: Aug. 11, 2022

(65) Prior Publication Data
US 2024/0039425 A1    Feb. 1, 2024

(30) Foreign Application Priority Data
Feb. 4, 2021   (JP) .................. 2021-016277

(51) Int. Cl.
*H02M 7/5387* (2007.01)
*H02M 1/08* (2006.01)

(52) U.S. Cl.
CPC .......... *H02M 7/5387* (2013.01); *H02M 1/08* (2013.01)

(58) Field of Classification Search
CPC .............................. H02M 7/5387; H02M 1/08
See application file for complete search history.

(56) References Cited

U.S. PATENT DOCUMENTS

2006/0034114 A1*   2/2006   Omura ............... H03K 17/6877
                                                    365/149
2006/0192589 A1*   8/2006   Okazaki ........... H03K 17/08122
                                                    326/112

(Continued)

FOREIGN PATENT DOCUMENTS

CN         104410264 A      3/2015
EP         2 093 871 A1     8/2009

(Continued)

OTHER PUBLICATIONS

Extended European Search Report dated Mar. 14, 2024, corresponding to Application No. EP 22749403, 10 pages.

*Primary Examiner* — Kyle J Moody
(74) *Attorney, Agent, or Firm* — Foley & Lardner LLP

(57) ABSTRACT

Between positive and negative electrode ends of battery 50, fuse 51, main contactor 52 and electrolytic capacitor C21 are connected in series. Between positive and negative electrode ends of electrolytic capacitor C21, inverter 54 in which upper phase side EFT (54U, 54V, 54W) and lower phase side FET (54X, 54Y, 54Z) are bridge-connected is connected. Resistor R1 for precharging electrolytic capacitor C21 is connected to main contactor 52 in parallel. The resistance value of resistor R1 is set so that in a precharging period until a key switch is turned on after battery 50 is connected, when the upper phase side FET is OFF-controlled and the lower phase side EFT is ON-controlled, the charge voltage value of electrolytic capacitor C21 is set to be able to limit a gate-source voltage of the upper phase side FET to a voltage at which the upper phase side FET is not turned on.

3 Claims, 12 Drawing Sheets

(56) References Cited

U.S. PATENT DOCUMENTS

| | | | | |
|---|---|---|---|---|
| 2007/0138993 A1* | 6/2007 | Tanaka | ............... | H01H 47/32 318/762 |
| 2008/0129372 A1* | 6/2008 | Rozsypal | ............ | H02M 3/07 327/536 |

FOREIGN PATENT DOCUMENTS

| | | |
|---|---|---|
| JP | 2005-006467 A | 1/2005 |
| JP | 2006-320176 A | 11/2006 |
| JP | 2010-158117 A | 7/2010 |
| JP | 2010-200554 A | 9/2010 |
| JP | 2019-033621 A | 2/2019 |
| WO | Wo-2020/159640 A1 | 8/2020 |

\* cited by examiner

CONFIGURATION OF INVERTER MAIN CIRCUIT

CALCULATION OF INRUSH CURRENT WHEN CLOSING MAIN CONTACTOR MC

CONTROL DEVICE AND CONTROL METHOD FOR POWER CONVERSION DEVICE

TECHNICAL FIELD

The present invention relates to a control device for a power conversion device such as an inverter/converter using power MOSFETs etc. in a main control circuit, which is applied to drive of an electric vehicle such as a battery forklift.

In particular, the present invention relates to a control device and a control method having FET arm gate drive circuits provided with FETs in upper and lower phase arms and configured to store (accumulate) gate drive energy of the upper phase side FET arms in capacitors of bootstrap circuits and drive the FET gates.

BACKGROUND ART

An example of configuration of a conventional power conversion device applied to drive of the electric vehicle such as the battery forklift is shown in FIGS. 1 to 5. FIG. 1 illustrates an overall configuration of an inverter for driving a motor of an electric vehicle having a battery as a power source (power supply). A reference sign 50 is a battery for the power supply. Between a positive electrode end P and a negative electrode end N of the battery 50, a protective fuse 51, a main contactor (MC) 52 for shutting off the power supply in an abnormal condition and an electrolytic capacitor C21 for smoothing the power supply are connected in series.

Between a common connection point (P2) of the fuse 51 and the main contactor 52 and a common connection point (P3) of the main contactor 52 and the electrolytic capacitor C21, a charging resistor (a first charging resistor) R1 for charging the electrolytic capacitor 21 with charge (electric charge) with a long time constant is connected.

A series circuit of a P-channel charging FET 53 and a charging resistor (a second charging resistor) R3 for charging the electrolytic capacitor C21 with charge with a charging time constant that is shorter than that of the charging resistor R1 is connected to the charging resistor R1 in parallel.

A discharging resistor R2 for discharging charge of the electrolytic capacitor C21 when the battery 50 is OFF (when the battery 50 is disconnected) is connected between a common connection point (a positive electrode end P3 of the electrolytic capacitor C21) of the charging resistor R1 and the charging resistor R3 and a negative electrode end (N) of the electrolytic capacitor C21.

Between the positive electrode end (P3) and the negative electrode end (N) of the electrolytic capacitor C21, an inverter 54 (a power conversion unit) in which upper phase side EFTs 54U, 54V and 54W and lower phase side FETs 54X, 54Y and 54Z are three-phase bridge-connected is connected. Each of the FETs 54U, 54V, 54W, 54X, 54Y and 54Z is composed of, for instance, an N-channel MOSFET.

A series circuit of a resistor 55U and a resistor 55X is connected to a series circuit of the U-phase FET 54U and the X-phase FET 54X in parallel. A common connection point of the resistor 55U and the resistor is connected to a common connection point of the U-phase FET 54U and the X-phase FET 54X.

A series circuit of a resistor 55V and a resistor is connected to a series circuit of the V-phase FET 54V and the Y-phase FET 54Y in parallel. A common connection point of the resistor 55V and the resistor is connected to a common connection point of the V-phase FET 54V and the Y-phase FET 54Y.

A series circuit of a resistor 55W and a resistor is connected to a series circuit of the W-phase FET 54W and the Z-phase FET 54Z in parallel. A common connection point of the resistor 55W and the resistor 55Z is connected to a common connection point of the W-phase FET 54W and the Z-phase FET 54Z. AC sides u, v and w of the inverter 54 are connected to a motor 56.

In the drawing, Vp4 indicates a voltage dividing point voltage of the resistor 55U and the resistor 55X, Vp5 indicates a voltage dividing point voltage of the resistor 55V and the resistor 55Y, and Vp6 indicates a voltage dividing point voltage of the resistor 55W and the resistor 55Z, and these voltage dividing point voltages are input to a CPU constituting a control unit (not shown).

An example of an upper phase side FET arm gate drive circuit and a lower phase side FET arm gate drive circuit of the device of FIG. 1 is shown in FIG. 2. FIG. 2 illustrates, as an example, a configuration of U-phase and X-phase FET arm gate drive circuits.

In FIG. 2, a reference sign 60 denotes a high withstand voltage IC (or a high voltage IC) (High Voltage Integrated Circuit; hereinafter, referred to as HVIC) for driving gates of the U-phase FET 54U and the X-phase FET 54X.

A reference sign 62 denotes a level shifter that increases a level of a gate control signal (HIN) of a high side circuit side which is input from a high side input terminal 61H. An internal circuit 63 at the high side is connected to an output side of the level shifter 62. A totem-pole circuit in which two n-channel FETs 64Ha and 64Hb are cascaded (cascade-connected) is connected to an output side of the internal circuit 63.

A reference sign 63L denotes an internal circuit at a low side which inputs a gate control signal (LIN) of a low side circuit side which is input from a low side input terminal 61L. A totem-pole circuit in which two n-channel FETs 64La and 64Lb are cascaded (cascade-connected) is connected to an output side of the internal circuit 63L.

A resistor 65H is connected between the high side input terminal 61H and a ground (an earth). A resistor is connected between the low side input terminal 61L and the ground.

A reference sign 70 denotes a gate power supply that outputs a gate power supply of, e.g. 14V. A capacitor C31 (an upper phase side gate drive power supply capacitor (a bootstrap capacitor)) is connected to an output side of the gate power supply 70 via an anode and a cathode of a diode D1. Also, a capacitor C32 (a lower phase side gate drive power supply capacitor) is connected to the output side of the gate power supply 70 via an anode and a cathode of a diode D2.

One end (at the diode D1 side) of the capacitor C31 is connected to a ground side end of the totem-pole circuit configured by the FETs 64Ha and 64Hb.

One end (at the diode D2 side) of the capacitor C32 is connected to a ground side end of the totem-pole circuit configured by the FETs 64La and 64Lb and the negative electrode end (N) of the battery 50 (not shown).

An output end (a common connection point of the FETs 64Ha and 64Hb) of the totem-pole circuit configured by the FETs 64Ha and 64Hb is connected to the gate of the U-phase FET 54U via a resistor R11. The ground side end of the totem-pole circuit configured by the FETs 64Ha and 64Hb is connected to a source of the U-phase FET 54U via a resistor R12. A resistor R14 is connected between the gate and the source of the U-phase FET 54U.

An output end (a common connection point of the FETs 64La and 64Lb) of the totem-pole circuit configured by the FETs 64La and 64Lb is connected to the gate of the X-phase FET 54X via a resistor R13. A resistor R15 is connected between the gate and a source of the X-phase FET 54X.

A cathode of a diode D3 is connected to a common connection point of the ground end of the totem-pole circuit configured by the FETs 64Ha and 64Hb and the resistor R12. An anode of the diode D3 is connected to the negative electrode end (N) of the battery 50 (to the source of the X-phase FET 54X).

The battery 50 is configured to be freely connectable and disconnectable.

FET arm gate drive circuits for V-phase and Y-phase and FET arm gate drive circuits for W-phase and Z-phase are also configured in the same manner as that in FIG. 2.

In the device configured above, the battery 50 is connected, a key switch (not shown) is tuned on and the electrolytic capacitor C21 is charged, and after the main contactor 52 is turned on, drive of the inverter 54 is started. Sequence up to the start of the drive of the inverter 54 will be described below.

(1) When the battery 50 is connected and subsequently the key switch is tuned on, the main contactor (MC) 52 is turned on. When turning the main contactor (MC) 52 on, a necessary condition is that when a mechanical contact (s) of the main contactor 52 is closed, a charging rush current flows from the battery 50 to the electrolytic capacitor C21. In order to suppress this charging rush current to an acceptable peak current value to the contact(s) of the main contactor 52, it is necessary to lower a primary and secondary potential difference of the main contactor 52 then close the contact(s).

Here, a path of the battery 50→a cable→the main contactor 52→the electrolytic capacitor C21 becomes a circuit composed of LRC by an inductor of the cable, a cable resistance and a battery internal equivalent resistance, as shown in FIG. 3.

In FIG. 3, a reference sign E is voltage of the battery 50, a reference sign L is the inductor of the cable, a reference sign R is the cable resistance and the battery resistance, and a reference sign C1 is a capacitance of the electrolytic capacitor C21.

A circuit equation is the following.
[Expression 1]

[Expression 1]
$$L\frac{di}{dt} + Ri + \frac{1}{C_1}\int i\,dt = E \quad (1)$$

The circuit equation is the above (1).

Here, since L is small, L is neglected for calculation, then a current i when the main contactor 52 is closed is the following.
[Expression 2]

[Expression 2]
$$i = \frac{E}{R}\exp\left(-\frac{1}{C_1 R}t\right) \quad (2)$$

Here, the lower the voltage difference is, the lower the peak current value is. From this, lowering the primary and secondary potential difference of the main contactor 52 is good for suppressing the inrush current of the contactor.

From a time point when the battery 50 is connected, the electrolytic capacitor C21 is charged through the charging resistor R1, and if the primary and secondary potential difference of the main contactor 52 is not equal to or less than a predetermined voltage difference when the key switch is turned on, in order to further charge the electrolytic capacitor C21, the charging FET 53 is turned on, and a charging operation is performed through the charging resistor R3. Then, when the potential difference between the electrodes of the contactor becomes equal to or less than the predetermined value, the main contactor 52 is closed.

(2) When the closing of the main contactor 52 is completed, the inverter 54 can start operating.

However, gate drive power supply energy is not stored (accumulated) in the upper phase side FET arm gate drive circuit (e.g. the U-phase FET arm gate drive circuit in FIG. 2) of the inverter 54. That is, in FIG. 5 showing a relationship between a stray capacitance (or a parasitic capacitance) of each terminal of the U-phase FET 54U and the U-phase FET arm gate drive circuit, since a charge-pump operation (a charging operation of the capacitor C31) has not been performed even once, at this time point, an output of the totem-pole circuit configured by the FETs 64Ha and 64Hb for driving the high side arm in the HVIC 60 is OFF at both of a source side and a sink side.

In FIG. 5, same elements or components as those of FIG. 2 are denoted by the same reference signs, but the diode D3, the resistors R13 and R15, the level shifter 62 and the resistors 65H and 65L in the HVIC 60 in FIG. 2 are omitted.

Crss of the U-phase FET 54U indicates a drain-gate capacitance (a feedback capacitance or a reverse transfer capacitance), and Cgs of the U-phase FET 54U indicates a gate-source capacitance (an input capacitance).

In the U-phase FET 54U, the high side arm driving FETs 64Ha and 64Hb of the HVIC 60 are in the OFF state. Therefore, if a gate-source voltage Vgs is charged with charge (electric charge) due to noise etc. from the outside in this state, there is no means to prevent malfunction other than the discharge capability of the resistor R14 between the gate and the source of the U-phase FET 54U.

(3) Charging sequence of the gate drive power supply energy of the upper phase side (U-phase) FET arm gate drive circuit and the lower phase side (X-phase) FET arm gate drive circuit (3-1) Charging sequence of the gate drive power supply energy of the X-phase FET arm gate drive circuit (see FIG. 4 showing the configuration of the gate drive circuit which is similar to FIG. 2)

Regarding the charging of the gate drive power supply energy of the X-phase FET arm gate drive circuit, at a time point when the gate power supply 70 is established, the gate drive power supply capacitor C32 is charged by a circuit of the gate power supply 70→the diode D2→the capacitor C32→0V. This charging is always performed because a continuously charging circuit is configured regardless of ON/OFF of the main circuit FET.

(3-2) Charging sequence of the gate drive power supply energy of the U-phase FET arm gate drive circuit (3-2-1) Voltage of the positive electrode end P3 of the electrolytic capacitor C21 is a battery voltage, and becomes a nominal voltage 72 V or greater. Although the capacitor C31 is charged by current flowing to the capacitor C31 from the gate power supply 70, as its charging circuit, by continuity (i.e. ON) of the lower phase side FET (X-phase), the following charging circuit is formed, then the capacitor C31 is charged.

The gate power supply 70→the diode D1→the capacitor C31→the resistor R12→the X-phase FET 54X→0V.

(3-2-2) An opportunity to turn on the X-phase FET 54X is a time when the inverter 54 is operated. As the inverter operation, normally, such a complementary PWM operation that when the upper phase side arm drive is ON, the lower phase side arm drive is OFF, and when the upper phase side arm drive is ON, the lower phase side arm drive is ON is performed. However, when the capacitor C31 is not charged, the upper phase side FET cannot be turned on. When the lower phase side FET (X-phase) is ON-driven next, the capacitor C31 is charged.

When the capacitor C31 is charged, either the upper FET or the lower FET (64Ha or 64Hb) of the totem-pole output of the upper phase side FET arm gate drive circuit is turned on or off according to the operation.

(3-2-3) When the inverter 54 is continuously operated so that the upper and lower arm FETs are continuously driven by the complementary PWM operation, since the capacitor C31 is continuously charged when the lower phase side FET (X-phase) is turned on, the drive circuit of the upper phase side FET (U-phase) can stably continue with ON/OFF.

Here, as the gate drive circuit of the FET in the conventional power conversion device, gate drive circuits described in, for instance, Patent Documents 1 and 2 have been proposed.

CITATION LIST

Patent Document

Patent Document 1: Japanese Unexamined Patent Application Publication No. 2019-033621
Patent Document 2: Japanese Unexamined Patent Application Publication No. 2010-200554

SUMMARY OF THE INVENTION

In the above (3-2-2) of BACKGROUND ART, a drain-source voltage of the lower phase side FET (the X-phase FET 54X) when the lower phase side FET (the X-phase FET 54X) is turned on during the inverter operation abruptly becomes zero volt from a voltage value (Vp4) applied by the voltage dividing resistors (the potential dividing resistors) 55U and 55X of FIG. 1.

At this time, an extremely large+dv/dt is applied between the drain and the source of the upper phase side FET (the U-phase FET 54U).

In that case, Crss (the drain-gate capacitance) and Cgs (the gate-source capacitance) formed inside the FET depicted in FIG. 5 are brought to a state in which these Crss and Cgs are connected in series to Vds voltage applied to the drain-source of the U-phase FET 54U, then charge (electric charge) is charged in Crss and Cgs.

In a normal gate drive state, the above-described gate drive power supply energy (charge voltage of the capacitor C31) of the U-phase FET 54U exists, and regarding the output of the totem-pole circuit configured by the U-phase arm drive FETs 64Ha and 64Hb of the HVIC 60, the output is operated (sink-operated) in an OFF direction in the gate drive circuit. Therefore, the charge (the electric charge) charged in Cgs is discharged to (by or through) the resistor R11+the resistor R12, then the charge of Cgs is not charged. Thus, the gate-source voltage Vgs does not rise, then the U-phase FET 54U does not shift to ON-operation.

However, at a time of an initial drive (a first drive), since there is no gate drive power supply energy of the U-phase FET 54U, the output of the totem-pole circuit configured by the U-phase arm drive FETs 64Ha and 64Hb of the HVIC 60 is not operated (in the OFF state) at both of the source and sink sides. Therefore, because the charge (the electric charge) charged in Cgs by the applied Vds can only be discharged through the resistor R14 (high resistance), depending on the Vds value, Crss, Cgs and Vgs (th) (a characteristic value of the FET, which is a threshold value of the gate-source voltage Vgs (at which a continuity state of the FET is changed (current of the threshold value or more starts to flow between the drain and the source) at a certain drain-source voltage), the upper phase side FET (the U-phase FET 54U) is ON-operated (which is not in a complete ON-state, but has an ON-resistance of a certain value or less which is in an active state) when Vds is applied to the U-phase FET 54U (=when the lower phase side (X-phase) FET is turned on), and consequently, an arm short-circuit current may flow from the terminal P3 power supply to the upper phase side FET (the U-phase FET 54U) and the lower phase side FET (the X-phase FET 54X).

Voltage of Cgs can be determined as follows. When a series combined value of capacitance of the drain-gate-source is C, C is the following.

[Expression 3]

$$C = \frac{C_{rss} C_{gs}}{C_{rss} + C_{gs}} \quad (3)$$

When voltage V is applied between the drain and the source, charge Q stored (accumulated) between the drain and the source is the following.

[Expression 4]

$$C \cdot V = Q = C_{rss} \cdot V_{dg} = C_{gs} \cdot V_{gs} \quad (4)$$

From the above,

[Expression 5]

$$V_{gs} = \frac{C \cdot V}{C_{gs}} \quad (5)$$

Vgs is the above (5).

Further, in a case where as a circuit board (a substrate) on which the above electronic components are mounted, a metal base board (a metal base substrate) whose back surface is a metal plate is used, in addition to these capacitances between the FET terminals, capacitances between the base metal and the terminals affect the characteristics.

Here, various stray capacitances (or various parasitic capacitances) of a case where the U-phase FET 54U and the X-phase FET 54X shown in FIGS. 1 and 2 are mounted on the metal base board (the metal base substrate) will be described with reference to FIG. 9.

In FIG. 9, Batt indicates the battery 50 of FIG. 1, C4 indicates the electrolytic capacitor C21 of FIG. 1.

The U-phase FET 54U and the X-phase FET 54X are mounted on the metal base board (the metal base substrate) in parallel by soldering.

C1 and C5 are gate-source capacitances of the U-phase FET 54U and the X-phase FET 54X, C2 and C6 are drain-gate capacitances of the U-phase FET 54U and the X-phase FET 54X, and C3 and C7 are output capacitances of the U-phase FET 54U and the X-phase FET 54X.

C8 to C12 are capacitances formed by dielectric constant (or permittivity) of an insulating layer(s) between the base metal (aluminium) and patterns, and these capacitances affect the characteristics.

Assuming that capacitance characteristics Crss and Cgs of the upper phase side EFT (the U-phase FET 54U) and the lower phase side EFT (the X-phase FET 54X) are Crss=105 pF and Cgs=5270 pF, a series combined value C of the both capacitances is calculated as follows.

$$a\ series\ combined\ value\ C = 105 \times 5270/(105+5270)$$
$$= 102.9\ pF$$

$$Q = CV = 102.9\ pF \times 24v = 2469.6[pC]$$

$$Vgs = Q/Cgs = 2469.6\ pC/5270\ pF = 0.46[V]$$

Effects on the gate-source voltage Vgs which are determined from numerical values of Crss and Cgs are as described above, but these are based on calculation of the FET alone.

However, as a result of measurement of Vgs in an actual inverter state (in a state in which the FET is mounted on the metal base board (the metal base substrate)), it rose to about 5V.

Because of this, the upper phase side FET (the U-phase FET 54U) is turned on (ON-operated), and consequently, the short-circuit current passes through the upper and lower FETs for a short period of time.

As precaution of this problem, the following measures exist in the prior arts.

(1) Make the parallel resistance R14 between Vgs shown in FIGS. 2 and 5 even lower.

→Problem: Regarding the resistor R14, since a driving circuit consumption current become large when ON-driving the FET, it is necessary to increase the capacitance of the upper phase side FET drive power supply capacitor (the capacitor C31). Then, since the consumption current becomes large and also time required to charge the electric charge becomes longer, there is a need to increase a minimum ON-electric conductivity of the lower phase side FET. Consequently, a minimum operation voltage of the inverter deteriorates.

(2) Insert a capacitor in parallel between the gate and the source of the FET, and increase Cgs and lower voltage of Cgs.

→Problem: The same problem as the above (1) occurs. Further, in a case where there is a current limit in the gate drive circuit, since a charging time constant of Vgs increases when driving the FET gate, transition period at turn-on and turn-off becomes longer, and an FET switching loss for the transition period increases, then heat generation becomes high.

Next, an example of a conventional process from ON of the key switch to start of the inverter operation of the device of FIGS. 1 to 5 will be described with reference to FIGS. 6 and 7. In FIG. 6 showing a flow chart of the conventional process, the battery 50 of FIG. 1 is connected to the circuit before step S1. Then, at step S1, the key switch is turned on.

Next, at step S2, a judgment is made as to whether or not the voltage of the positive electrode end P3 of the electrolytic capacitor C21 of FIG. 1 is 63V or less. If the judgment result is YES, at step S3, a quick charging process (the charging FET 53 is turned on) is performed.

Subsequently, at step S4, a judgment is made as to whether or not the voltage of the positive electrode end P3 is 5V or less and also its state continues for seconds. If the judgment result of step S4 is YES, at step S5, a predetermined quick charging error process (process in which the main circuit FET (s) of the inverter and the electrolytic capacitor C21 are judged to be short-circuited, and this abnormal state is notified to a host controller (not shown)) is performed.

If the judgment result of step S4 is NO or after the process of step S5, at step S6, a judgment is made as to whether or not the voltage of the positive electrode end P3 is 63V or less and also its state continues for 3.6 seconds.

If the judgment result of step S6 is YES, at step S7, a predetermined quick charging error process (process in which an error state is notified to the host controller (not shown)) is performed.

If the judgment result of step S6 is NO or after the process of step S7, at step S8, a judgment is made as to whether or not the voltage of the positive electrode end P3 is 3V or less and also its state continues for seconds.

If the judgment result of step S8 is YES, at step S9, the upper and lower phase FETs are judged to be short-circuited.

If the judgment result of step S2 is NO or the judgment result of step S8 is NO, at step S10, the main contactor 52 of FIG. 1 is turned on, and after the turning-on of the main contactor 52, at step S11, the operation of the inverter 54 is started.

According to the conventional process flow of FIG. 6, the upper and lower phase arms are driven for the first time by the operation of the inverter at step S11, and by turning-on of the lower phase side arm FET (the X-phase FET 54X), the gate drive power supply capacitor (the capacitor C31) of the upper phase side FET arm gate drive circuit is charged with charge (electric charge), then operation of the upper phase arm becomes possible.

Next, operation waveform of each part of the device and capacitance of the FET when performing the process along the flow chart of FIG. 6 will be described with reference to FIGS. 7 and 8. FIG. 7 is a time chart showing operation waveform of only a set of upper and lower arms of the U-phase and the X-phase. Capacitances of these U-phase FET and X-phase FET are shown in FIG. 8.

In FIG. 8, Batt indicates the battery 50 of FIG. 1, C4 indicates the electrolytic capacitor C21 of FIG. 1. C1 indicates the gate-source capacitance of the U-phase FET 54U, C5 indicates the gate-source capacitance of the X-phase FET 54X, C2 indicates the drain-gate capacitance of the U-phase FET 54U, C6 indicates the drain-gate capacitance of the X-phase FET 54X, C3 indicates the drain-source capacitance of the U-phase FET 54U, and C7 indicates the drain-source capacitance of the X-phase FET 54X.

Vds is the drain-source voltage (voltage between Vp3 and Vp4) of the U-phase FET. In FIG. 8, operation of the X-phase FET is illustrated as a relay S1 (SW).

In FIG. 7, (a) is a voltage Vp3 of the positive electrode end P3 of the electrolytic capacitor C21, which corresponds to voltage Vp3 in FIG. 8.

(b) is the drain-source voltage Vds (the voltage between Vp3 and Vp4 in FIG. 8) of the upper phase side U-phase FET.

(c) is Vp4 (a drain-source voltage Vds of the X-phase FET: the voltage Vp4 in FIGS. 8 and 1) at the drain side of the lower phase side X-phase FET.

(d) is a gate voltage of the U-phase FET.

(e) is a power supply voltage of the U-phase gate drive circuit (a power supply voltage of the upper phase side FET arm gate drive circuit (the high side totem-pole circuit of the HVIC 60)).

(f) is a U-phase gate signal (a PWM signal of the U-phase FET 54U).

(g) is a gate voltage of the X-phase FET.

(h) is a power supply voltage of the X-phase gate drive circuit (a power supply voltage of the lower phase side FET arm gate drive circuit (the low side totem-pole circuit of the HVIC 60)).

(i) is an X-phase gate signal (a PWM signal of the X-phase FET 54X).

(j) is the short-circuit current flowing from the U-phase FET to the X-phase FET.

First, at time t1, when the battery 50 is connected, a charging current flows from the battery 50 to the electrolytic capacitor C21 through the fuse 51 and the charging resistor R1, and a precharging of the electrolytic capacitor C21 is started, then Vp3 increases as shown in FIG. 7 (a).

Next, at time t2 (an execution time of the process at step S1 in FIG. 6), when the key switch is turn on, the capacitor C32 is charged with charge from the gate power supply 70 of FIG. 2 through the diode D2, and as shown in FIG. 7 (h), the power supply voltage of the X-phase gate drive circuit (the power supply voltage of the low side totem-pole circuit of the HVIC 60) rises.

At time t3 after a lapse of a predetermined time after the key switch is turn on at time t2, when the charging FET 53 is turned on, current flows to the electrolytic capacitor C21 through the charging FET 53 and the charging resistor R3, and the quick charge of the electrolytic capacitor C21 is started. This time t3 is an execution time of the process at step S3 in FIG. 6.

At time t4 at which the voltage Vp3 of the electrolytic capacitor C21 increases and the potential difference between the electrodes of the main contactor 52 becomes equal to or less than the predetermined value, the main contactor 52 is closed. This time t4 is an execution time of the process at step S10 in FIG. 6.

Next, at time t5 (an execution time of the process at step S11 in FIG. 6) at which the inverter operation is started and the U-phase gate signal (the PWM signal) is input as shown in FIG. 7(f), since the X-phase FET 54X has not been ON-controlled yet, no current flows along a path shown by a broken arrow in FIG. 4 (showing the same configuration as that of FIG. 2), then the power supply voltage of the U-phase gate drive circuit (the voltage of the gate drive power supply capacitor C31 of the upper phase side FET arm gate drive circuit) of FIG. 7(e) has not been risen yet. Because of this, as shown in FIG. 7(d), the gate of the U-phase FET 54U is not ON at time t5.

Next, at time t6, as shown in FIG. 7(i), the X-phase gate signal (the PWM signal) is input, and the gate of the X-phase FET 54X is ON as shown in FIG. 7(g). Therefore, the U-phase gate drive power supply capacitor C31 is charged, and as shown in FIG. 7(e), the power supply voltage of the U-phase gate drive circuit rises.

At this time t6, since the U-phase gate signal is OFF as shown in FIG. 7(f), the drain-source voltage Vds of the U-phase FET 54U rises as shown in FIG. 7(b). And, by dv/dt of this Vds, as shown in FIG. 7(d), the voltage Vgs is produced between the gate and the source of the U-phase FET 54U via the drain-gate capacitance Crss of the U-phase FET 54U denoted by C2 in FIG. 8. Since this Vgs slightly exceeds the threshold value Vgs(th) of the gate-source voltage of the U-phase FET 54U, the drain-source ON-resistance slightly lowers, and consequently, as shown in FIG. 7 (j), the short-circuit current flows along a path of the drain of the U-phase FET 54U→the source of the U-phase FET 54U→the drain of the X-phase FET 54X→the source of the X-phase FET 54X.

Although FIG. 7 shows the time chart of only the set of upper and lower arms of the U-phase and the X-phase, the inverter has three sets of upper and lower arms of the U-phase and the X-phase, the V-phase and the Y-phase and the W-phase and the Z-phase, and these all show the operation as in FIG. 7.

As described above, the conventional control method shown in FIGS. 6 and 7 has a drawback of causing a malfunction due to the high voltage applied to the upper phase side FET then leading to the short circuit of the upper and lower phase arms.

In addition, Patent Document 1 describes a technique in which a driving transistor is separately provided, a voltage drop of a capacitor of a bootstrap circuit during a long-time intermittent driving operation is predicted by fluctuation (variation) of voltage of a separately provided capacitor, and an output terminal in a high impedance state is made to be low by the driving transistor. In the case of this technique of Patent Document 1, it is necessary to use elements by a large number of circuit configurations.

Further, Patent Document 2 describes a configuration in which a capacitor of a bootstrap circuit is charged at startup. However, this configuration is applied to a case where voltage at a time of start is high, and as a problem, there is a risk that a malfunction will occur due to high voltage.

The present invention is an invention that solves the above problems, and an object of the present invention is to provide a control device and a control method of a power conversion device which are capable of preventing the drawback of causing the malfunction due to the high voltage applied to the upper phase side FET and leading to the short circuit of the upper and lower phase arms.

As a control device of a power conversion device to solve the above problems described in claim 1, the power conversion device includes: a power conversion unit in which an upper phase side FET and a lower phase side FET are bridge-connected between positive and negative electrode ends of a DC power supply; an electrolytic capacitor connected to a series circuit of the upper phase side FET and the lower phase side FET of the power conversion unit in parallel; a main contactor interposed on an electric path connecting the positive electrode end of the DC power supply and a positive electrode end of the electrolytic capacitor; a first charging resistor connected to the main contactor in parallel for charging the electrolytic capacitor with a set charging time constant; a series circuit of a charging FET connected to the first charging resistor in parallel and configured to be ON-controlled after a set time after a key switch is turned on and a second charging resistor set to a charging time constant that is shorter than that of the first charging resistor; an upper phase side FET arm gate drive circuit configured to drive a gate of the upper phase side FET of the power conversion unit; a lower phase side FET arm gate drive circuit configured to drive a gate of the lower phase side FET of the power conversion unit; an upper phase side gate drive power supply capacitor configured to be charged when a gate power supply starts up by the turning-on of the key switch and also the lower phase side FET is ON-controlled, and served as a power supply of the upper phase side FET arm gate drive circuit; and a lower phase side gate drive power supply capacitor configured to be charged when the gate power supply starts up by the turning-on of the key switch and served as a power supply of the lower phase side FET arm gate drive circuit, and the power conversion device is configured so that the DC power supply is freely connectable and disconnectable, the control device is configured so that a value of resistance of the first charging resistor is set so that in a precharging period until the key switch is turned on after the DC power supply is brought to a connecting state, when the upper phase side FET is controlled to be OFF and the lower phase side FET is controlled to be ON, a charge voltage value of the electrolytic capacitor is set so as to be able to limit a gate-source voltage of the upper phase side FET to voltage at which the upper phase side FET is not turned on, and the control device comprises: a control unit configured so that when voltage of the electrolytic capacitor is the set charge voltage value after the key switch is turned on before the power conversion unit is operated, the lower phase side FET is controlled to be ON, then the upper phase side gate drive power supply capacitor is charged, and after the ON-control of the lower phase side FET, the charging FET is controlled to be ON, and further, when a potential difference between both ends of the main contactor becomes equal to or less than a set value, the main contactor is turned on, then operation of the power conversion unit is started.

As the control device of the power conversion device as described in claim 1, the charge voltage value of the electrolytic capacitor in the precharging period is set so that each parasitic capacitance generated between a metal base substrate and terminals of the upper phase side FET and the lower phase side FET of the power conversion unit when the upper phase side FET and the lower phase side FET are mounted on the metal base substrate is taken into consideration, and a voltage generated between the gate and a source of the upper phase side FET when an instantaneous voltage is applied between a drain and the source of the upper phase side FET is calculated, then a voltage value transiently applied to the gate-source voltage Vgs via each parasitic capacitance becomes low in a sufficiently large range as compared with a voltage value at which failure detection by continuation of low voltage between the drain and the source for a certain time is operated.

As a method of controlling a power conversion device described in claim 3, the power conversion device includes: a power conversion unit in which an upper phase side FET and a lower phase side FET are bridge-connected between positive and negative electrode ends of a DC power supply; an electrolytic capacitor connected to a series circuit of the upper phase side FET and the lower phase side FET of the power conversion unit in parallel; a main contactor interposed on an electric path connecting the positive electrode end of the DC power supply and a positive electrode end of the electrolytic capacitor; a first charging resistor connected to the main contactor in parallel for charging the electrolytic capacitor with a set charging time constant; a series circuit of a charging FET connected to the first charging resistor in parallel and configured to be ON-controlled after a set time after a key switch is turned on and a second charging resistor set to a charging time constant that is shorter than that of the first charging resistor; an upper phase side FET arm gate drive circuit configured to drive a gate of the upper phase side FET of the power conversion unit; a lower phase side FET arm gate drive circuit configured to drive a gate of the lower phase side FET of the power conversion unit; an upper phase side gate drive power supply capacitor configured to be charged when a gate power supply starts up by the turning-on of the key switch and also the lower phase side FET is ON-controlled, and served as a power supply of the upper phase side FET arm gate drive circuit; and a lower phase side gate drive power supply capacitor configured to be charged when the gate power supply starts up by the turning-on of the key switch and served as a power supply of the lower phase side FET arm gate drive circuit, and the power conversion device is configured so that the DC power supply is freely connectable and disconnectable, the method comprises:

setting a value of resistance of the first charging resistor so that in a precharging period until the key switch is turned on after the DC power supply is brought to a connecting state, when the upper phase side FET is controlled to be OFF and the lower phase side FET is controlled to be ON, a charge voltage value of the electrolytic capacitor is set so as to be able to limit a gate-source voltage of the upper phase side FET to voltage at which the upper phase side FET is not turned on, and as a step by a control unit, when voltage of the electrolytic capacitor is the set charge voltage value after the key switch is turned on before the power conversion unit is operated, controlling the lower phase side FET to be ON, then charging the upper phase side gate drive power supply capacitor, and after the ON-control of the lower phase side FET, controlling the charging FET to be ON, and further, when a potential difference between both ends of the main contactor becomes equal to or less than a set value, turning on the main contactor, then start operation of the power conversion unit.

(1) According to the invention described in claims 1 to 3, the charge voltage value of the electrolytic capacitor in the precharging period is set to be lower than that of the conventional device or method. And, when the voltage of the electrolytic capacitor is the set charge voltage value that is lower than that of the conventional device or method, the lower phase side EFT is controlled to be ON, then the upper phase side gate drive power supply capacitor is charged. Therefore, the applied voltage dv/dt between the drain and the source of the upper phase side FET, which is generated when the lower phase side FET is first ON-controlled (is first turned on), can be reduced.

With this, the charge (the electric charge) charged along the path of the drain-gate capacitance (Crss) of the upper phase side FET→the gate-source capacitance Cgs of the upper phase side FET is reduced, then the voltage of the gate-source voltage Vgs can be lowered. As a result, the malfunction of the short-circuit between the upper and lower phase arms can be prevented.

(2) According to the invention described in claim 2, since the charging voltage value of the electrolytic capacitor in the precharging period is set by taking into consideration each stray capacitance (or each parasitic capacitance) in the state in which the FETs are mounted on the metal base substrate and by calculating the gate-source voltage of the upper phase side FET when an instantaneous voltage is applied between the drain and the source of the upper phase side FET, setting accuracy of the charging voltage value of the electrolytic capacitor can be increased, and erroneous failure detection can be avoided.

EMBODIMENTS FOR CARRYING OUT THE INVENTION

Although embodiments of the present invention will be described below with reference to the drawings, the present invention is not limited to the following embodiments. In the present embodiments, a power conversion device such as an inverter/converter using power MOSFETs etc. in a main control circuit is configured so that especially when a power supply voltage is high, an occurrence of a malfunction (an unintended ON-operation) of an upper phase side FET of a main circuit is prevented.

Further, an FET gate drive circuit(s) is configured so that when resuming operation of the inverter/converter (the power conversion device) after continuation of a long-time stop period of the inverter/converter (the power conversion device), the above malfunction is prevented.

The embodiment of the present invention applied to the power conversion device of FIGS. 1 to 5 will be described below. A value of resistance of the resistor R1, which is a first charging resistor in FIG. 1, is set so that in a precharging period until the key switch is turned on after the battery 50 is brought to the connecting state, when the upper phase side FET, e.g. the U-phase FET 54U, is controlled to be OFF and the lower phase side EFT, e.g. the X-phase FET 54X, is controlled to be ON, a charge voltage value of the electrolytic capacitor C21 is set so as to be able to limit the gate-source voltage of the U-phase FET 54U to voltage at which the U-phase FET 54U is not turned on.

Further, the control unit is configured so that when the voltage of the electrolytic capacitor C21 is the set charge voltage value after the key switch is turned on before the inverter 54 is operated, the lower phase side EFT, e.g. the X-phase FET 54X, is controlled to be ON, then the upper phase side gate drive power supply capacitor (the capacitor C31) is charged, and after the ON-control of the lower phase side EFT (the X-phase FET 54X), the charging FET 53 is controlled to be ON, and further, when the potential difference between both ends of the main contactor 52 becomes equal to or less than the set value, the main contactor 52 is closed (turned on), then operation of the inverter 54 is started.

Figure 1:
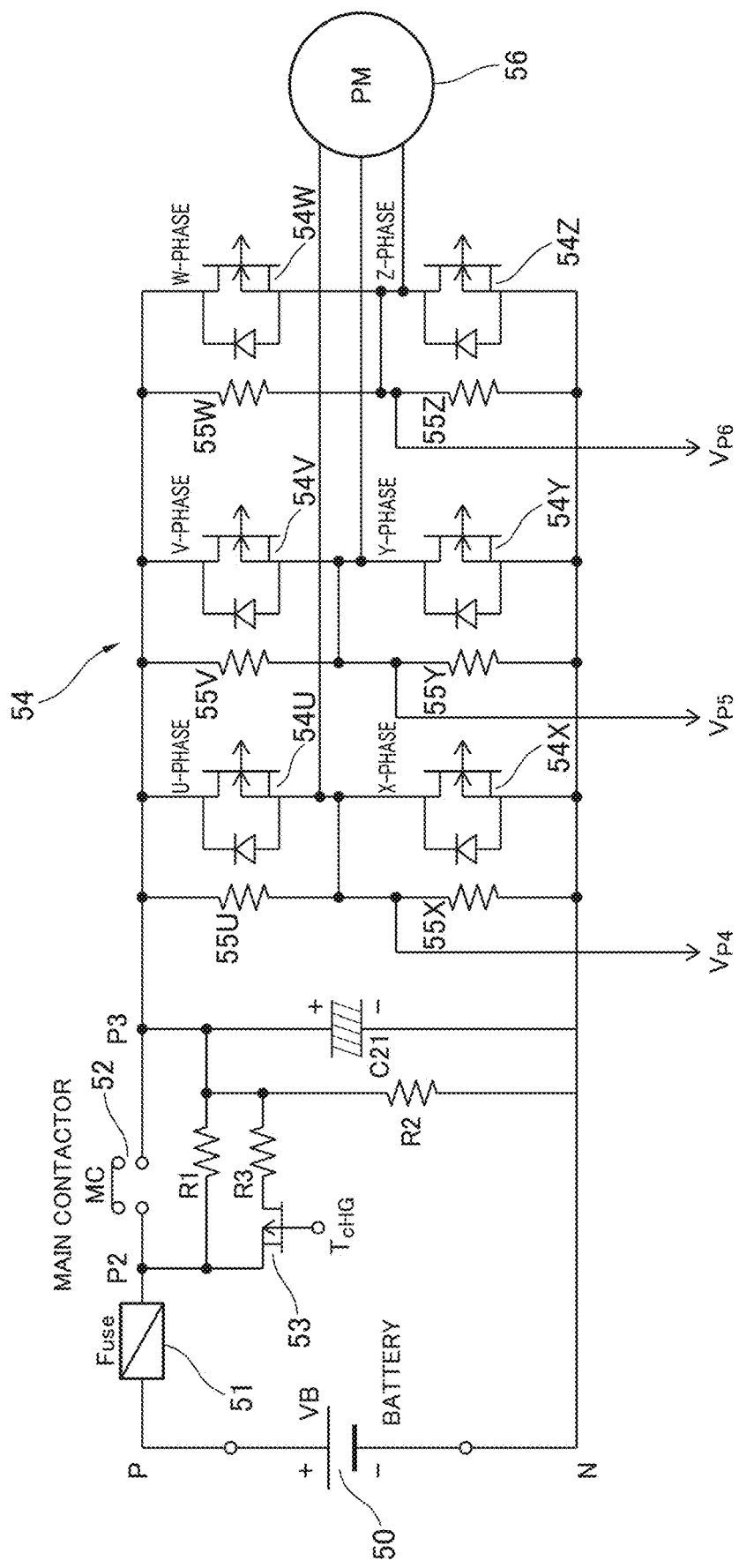
FIG. 1 is a configuration of a main circuit of an inverter to which the present invention is applied.

In the configuration of the power conversion device of FIG. 1, when, e.g. a 72V battery, is applied, a precharging voltage value of the electrolytic capacitor C21 before the key switch is turned on after the battery 50 is connected, which was about 50V in the conventional configuration, is lowered to about 20V in the present embodiment.

This precharging voltage value of the electrolytic capacitor C21 is set so that each stray capacitance (or each parasitic capacitance) generated between a metal base substrate and terminals of the upper phase side FET (e.g. the U-phase FET 54U) and the lower phase side EFT (e.g. the X-phase FET 54X) of the inverter 54 when the upper phase side FET and the lower phase side EFT are mounted on the metal base substrate is taken into consideration, and a voltage generated between the gate and the source of the upper phase side FET when an instantaneous voltage is applied between the drain and the source of the upper phase side FET is calculated, then a voltage value transiently applied to the gate-source voltage Vgs via each parasitic capacitance becomes low in a sufficiently large range as compared with a voltage value at which failure detection by continuation of low voltage between the drain and the source for a certain time is operated.

Figure 10:
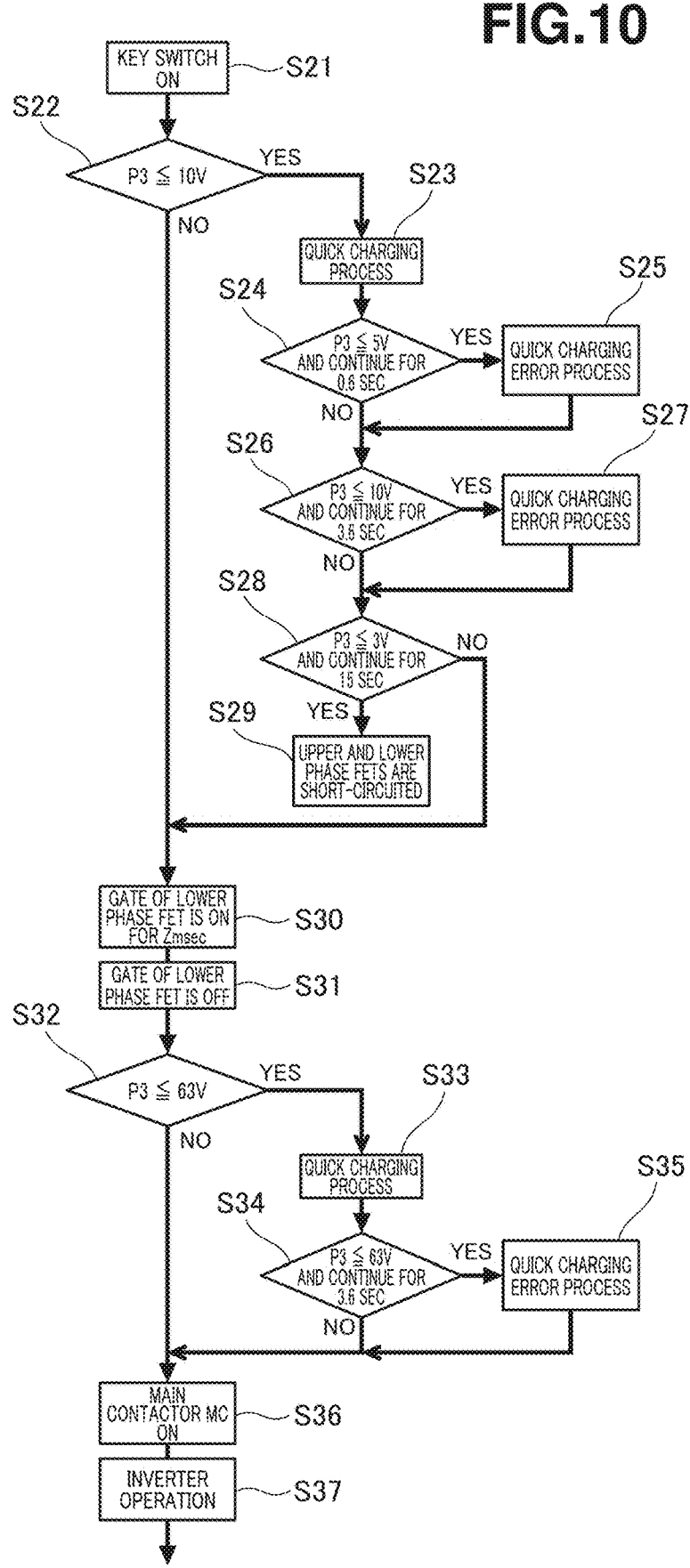
FIG. 10 is a flow chart of process of an embodiment of the present invention.

Next, an example of a process of the present embodiment from ON of the key switch to start of the inverter operation of the device of FIGS. 1 to 5 will be described with reference to FIGS. 10 and 12. In FIG. 10 showing a flow chart of the process of the present embodiment, the battery 50 of FIG. 1 is connected to the circuit before step S21. Then, at step S21, the key switch is turned on.

Next, at step S22, a judgment is made as to whether or not the voltage of the positive electrode end P3 of the electrolytic capacitor C21 of FIG. 1 is 10V or less. If the judgment result is YES, at step S23, a quick charging process (the charging FET 53 is turned on) is performed.

Subsequently, at step S24, a judgment is made as to whether or not the voltage of the positive electrode end P3 is 5V or less and also its state continues for seconds. If the judgment result of step S24 is YES, at step S25, a predetermined quick charging error process (process in which the main circuit FET (s) of the inverter and the electrolytic capacitor C21 are judged to be short-circuited, and this abnormal state is notified to a host controller (not shown)) is performed.

If the judgment result of step S24 is NO or after the process of step S25, at step S26, a judgment is made as to whether or not the voltage of the positive electrode end P3 is 10V or less and also its state continues for 3.6 seconds.

If the judgment result of step S26 is YES, at step S27, a predetermined quick charging error process (process in which an error state is notified to the host controller (not shown)) is performed.

If the judgment result of step S26 is NO or after the process of step S27, at step S28, a judgment is made as to whether or not the voltage of the positive electrode end P3 is 3V or less and also its state continues for seconds.

If the judgment result of step S28 is YES, at step S29, the upper and lower phase FETs are judged to be short-circuited.

If the judgment result of step S22 is NO or the judgment result of step S28 is NO, at step S30, the gate of the lower phase side FET, e.g. the X-phase FET 54X, is ON-controlled (is controlled to be on) only for Zmsec, and after that, at step S31, the gate of the X-phase FET 54X is OFF-controlled (is controlled to be off).

Next, at step S32, a judgment is made as to whether or not the voltage Vp3 of the positive electrode end P3 of the electrolytic capacitor C21 is 63V or less. If the judgment result is YES, at step S33, the charging FET 53 of FIG. 1 is turned on again, and the quick charging of the electrolytic capacitor C21 is performed.

Next, at step S34, a judgment is made as to whether or not the voltage Vp3 is 63V or less and also its state continues for 3.6 seconds. If the judgment result of step S34 is YES, at step S35, a quick charging error process such as a process in which an abnormal state is notified to the host controller (not shown) is performed.

If the judgment result of step S34 is NO or after the process of step S35, at step S36, the main contactor 52 of FIG. 1 is turned on, and after the turning-on of the main contactor 52, at step S37, the inverter 54 is operated.

At a time of this step S37, since the upper phase (U-phase) side FET arm gate drive power supply capacitor (the capacitor C31) is charged with charge (electric charge), the upper phase (U-phase) arm does not malfunction such as the arm short-circuit operation.

Figure 12:
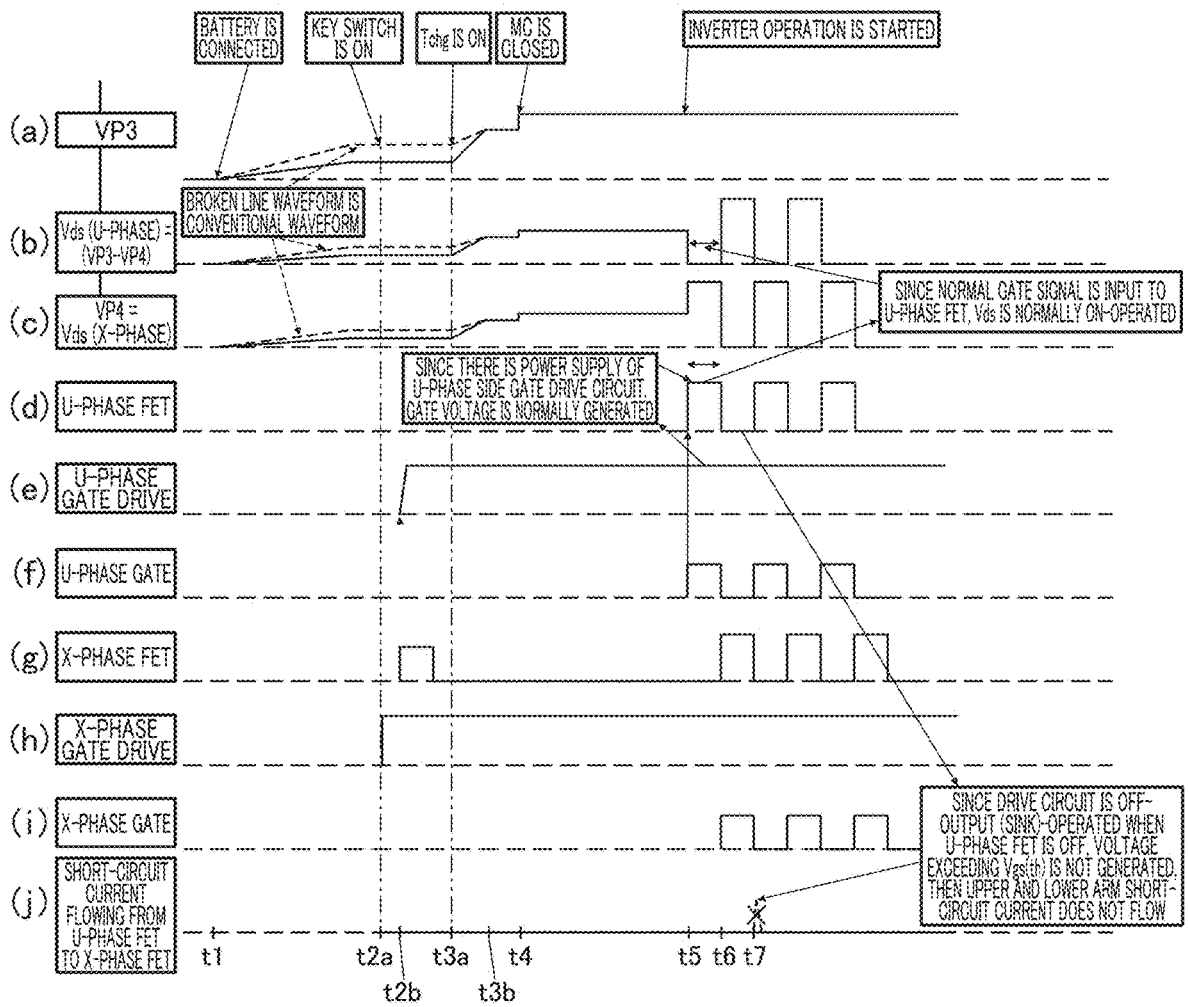
FIG. 12 is a time chart showing operation waveform of each part by process of the present embodiment.

FIG. 12 shows operation waveform of each part of only a set of upper and lower arms of the U-phase and the X-phase when the process along the flow chart of FIG. 10 is performed.

Figure 8:
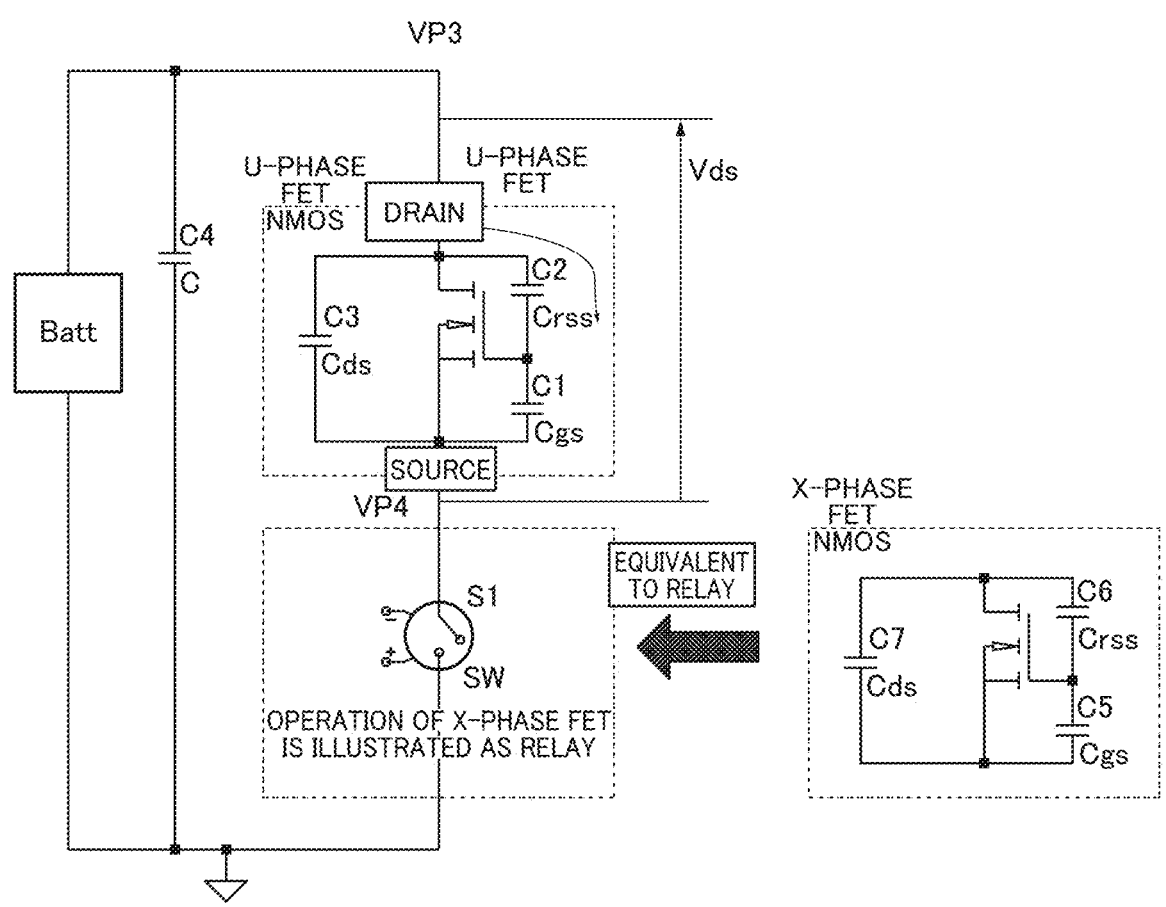
FIG. 8 is an explanatory drawing showing each capacitance of a U-phase FET and an X-phase FET.
Figure 9:
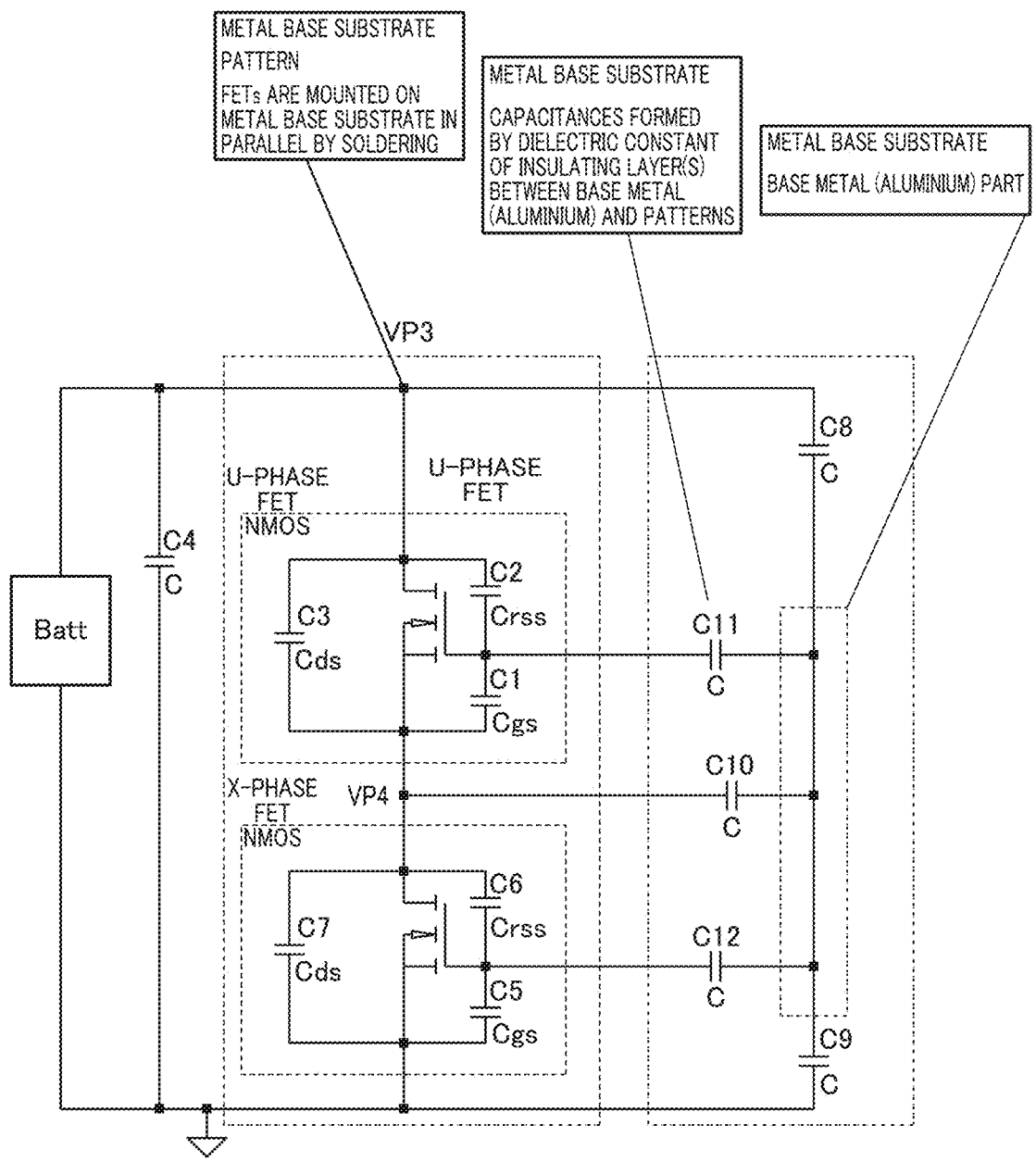
FIG. 9 is an explanatory drawing showing each parasitic capacitance in a case where the U-phase FET and the X-phase FET are mounted on a metal base board (a metal base substrate).

In FIG. 12, (a) is the voltage Vp3 of the positive electrode end P3 of the electrolytic capacitor C21, which corresponds to the voltage Vp3 in FIG. 8.

(b) is the drain-source voltage Vds (the voltage between Vp3 and Vp4 in FIG. 8) of the upper phase side U-phase FET.

(c) is Vp4 (the drain-source voltage Vds of the X-phase FET: the voltage Vp4 in FIGS. 8 and 1) at the drain side of the lower phase side X-phase FET.

(d) is the gate voltage of the U-phase FET.

(e) is the power supply voltage of the U-phase gate drive circuit (the power supply voltage of the upper phase side FET arm gate drive circuit (the high side totem-pole circuit of the HVIC 60)).

(f) is the U-phase gate signal (the PWM signal of the U-phase FET 54U).

(g) is the gate voltage of the X-phase FET.

(h) is the power supply voltage of the X-phase gate drive circuit (the power supply voltage of the lower phase side FET arm gate drive circuit (the low side totem-pole circuit of the HVIC 60)).

(i) is the X-phase gate signal (the PWM signal of the X-phase FET 54X).

(j) is the short-circuit current flowing from the U-phase FET to the X-phase FET.

First, at time t1, when the battery 50 is connected, a charging current flows from the battery 50 to the electrolytic capacitor C21 through the fuse 51 and the charging resistor R1, and the precharging of the electrolytic capacitor C21 is started, then Vp3 increases as shown in FIG. 12(a).

In the present embodiment, since the charging resistor R1 is set so that the precharging voltage value of the electrolytic capacitor C21 of FIG. 1 becomes low, as shown in FIGS. 12(a), (b) and (c), voltage waveforms move (increase) at Vp3, Vds and Vp4 that are lower than the voltage waveforms shown by broken lines according to the conventional control method.

Figure 2:
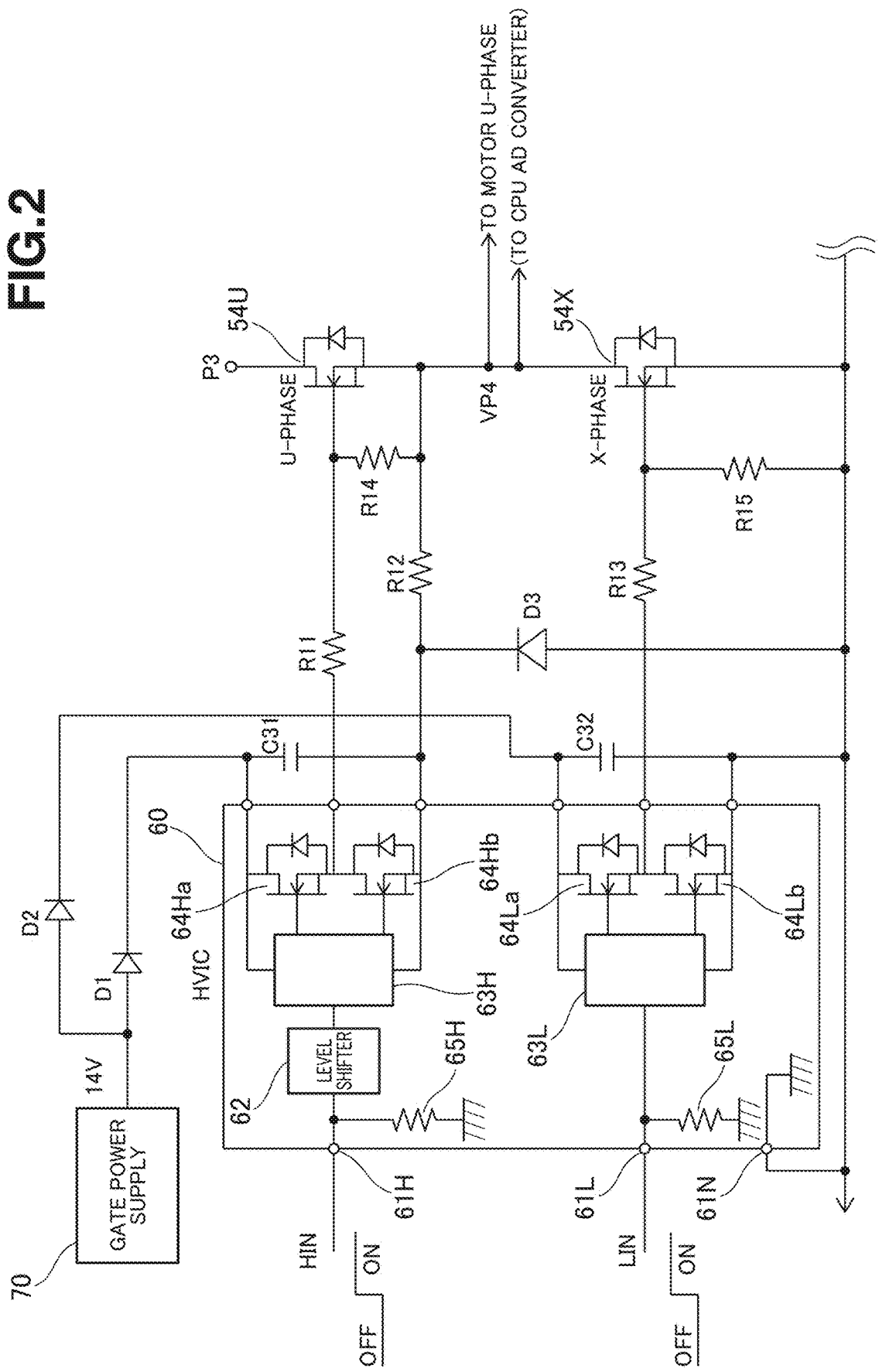
FIG. 2 is a circuit diagram of gate drive circuits of U-phase and X-phase of FIG. 1.
Figure 3:
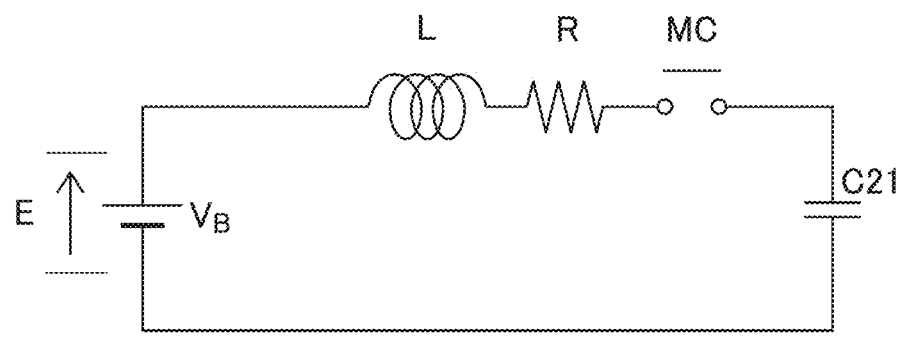
FIG. 3 is an explanatory drawing showing a calculation method of an inrush current when closing a main contactor of FIG. 1.
Figure 4:
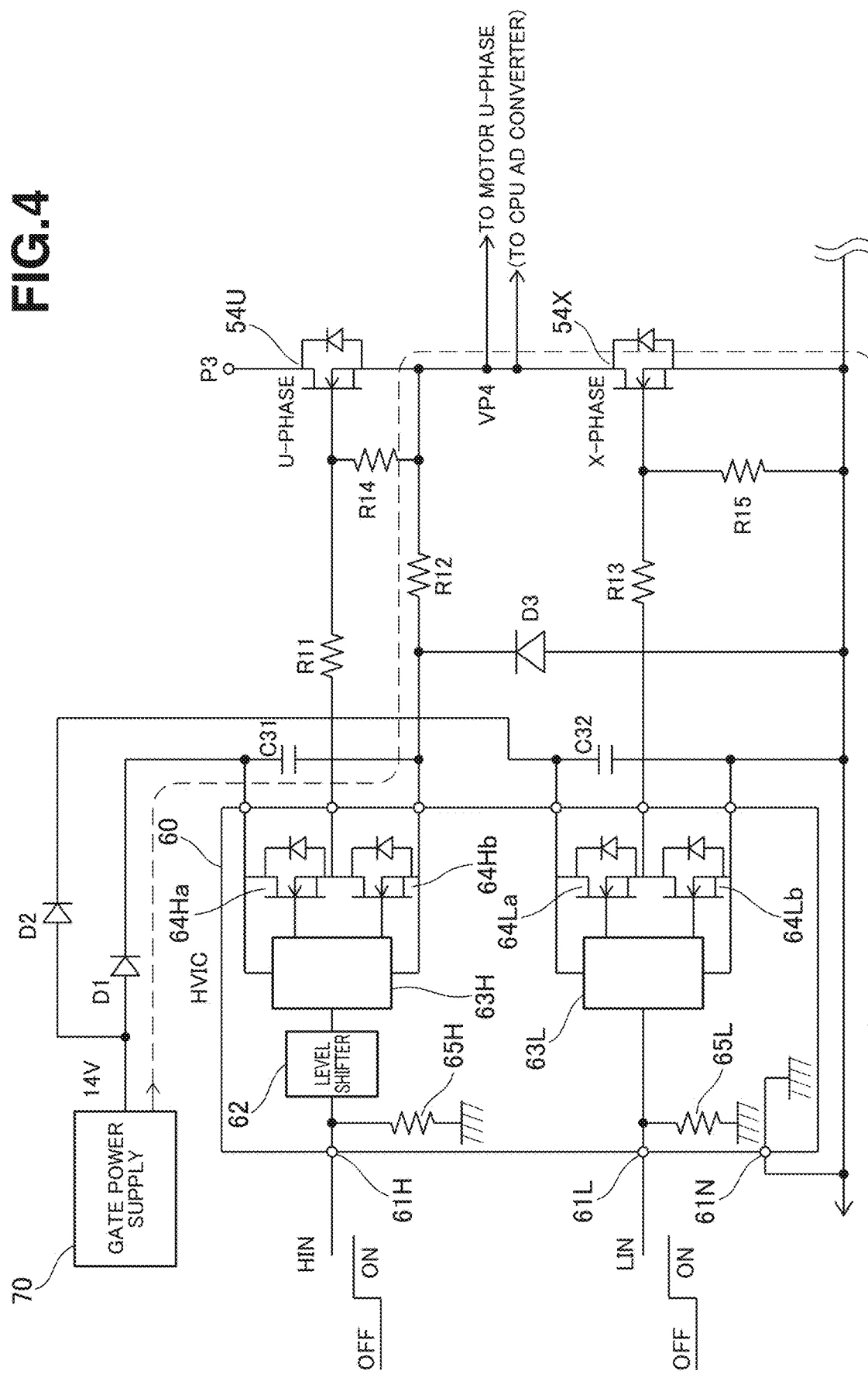
FIG. 4 is a circuit diagram showing a charge path of a capacitor C31 of FIG. 2.

At time t2a (an execution time of the process at step S21 in FIG. 10), when the key switch is turn on, the capacitor C32 is charged with charge from the gate power supply 70 of FIG. 2 through the diode D2, and as shown in FIG. 12(h), the power supply voltage of the X-phase gate drive circuit (the power supply voltage of the low side totem-pole circuit of the HVIC 60) rises.

When the precharging of the electrolytic capacitor C21 is not completed (in FIG. 10, the judgment result of step S22 is YES) after the key switch is turn on at time t2a, the charging FET 53 of FIG. 1 is turned on, and processes of steps S23 to S29 in FIG. 10 are performed.

Next, at time t2b (an execution time of the process at step S30 in FIG. 10), as shown in FIG. 12(g), the gate of the X-phase FET 54X is ON-controlled. With this, current flows along the path shown by a broken arrow in FIG. 4, and the upper phase (U-phase) side gate drive power supply capacitor (the capacitor C31) is charged, then as shown in FIG. 12(e), the power supply voltage of the U-phase gate drive circuit rises.

Next, at time t3a (an execution time of the process at step S31 in FIG. 10), as shown in FIG. 12 (g), the gate of the X-phase FET 54X is OFF-controlled.

Next, at time t3b (an execution time of the process at step S33 in FIG. 10), the charging FET 53 is turned on, and current flows to the electrolytic capacitor C21 through the charging FET 53 and the charging resistor R3, and the quick charge of the electrolytic capacitor C21 is performed.

Next, at time t4 at which the voltage Vp3 of the electrolytic capacitor C21 increases and the potential difference between the electrodes of the main contactor 52 becomes equal to or less than the predetermined value, the main contactor 52 is closed. This time t4 is an execution time of the process at step S36 in FIG. 10.

Subsequently, at time t5 (an execution time of the process at step S37 in FIG. 10) of the operation start time of the inverter 54, as shown in FIG. 12 (f), when the U-phase gate signal (the PWM signal) is input, since the power supply voltage (the voltage of the capacitor C31) of the U-phase gate drive circuit has already been established at this time t5 as shown in FIG. 12 (e), as shown in FIG. 12 (d), the gate signal (the gate voltage) of the U-phase FET 54U is normally generated.

With this, the U-phase FET 54U is ON-controlled, and as shown in FIG. 12 (b), the drain-source voltage Vds of the U-phase FET 54U correctly becomes zero (normal ON-operation is performed).

Next, at time t6, as shown in FIGS. 12 (i) and (f), when the X-phase gate signal (the PWM signal) is on and the U-phase gate signal (the PWM signal) is off, as shown in FIGS. 12(g) and (d), the gate of the X-phase FET 54X is turned on and the gate of the U-phase FET 54U is turned off.

Figure 5:
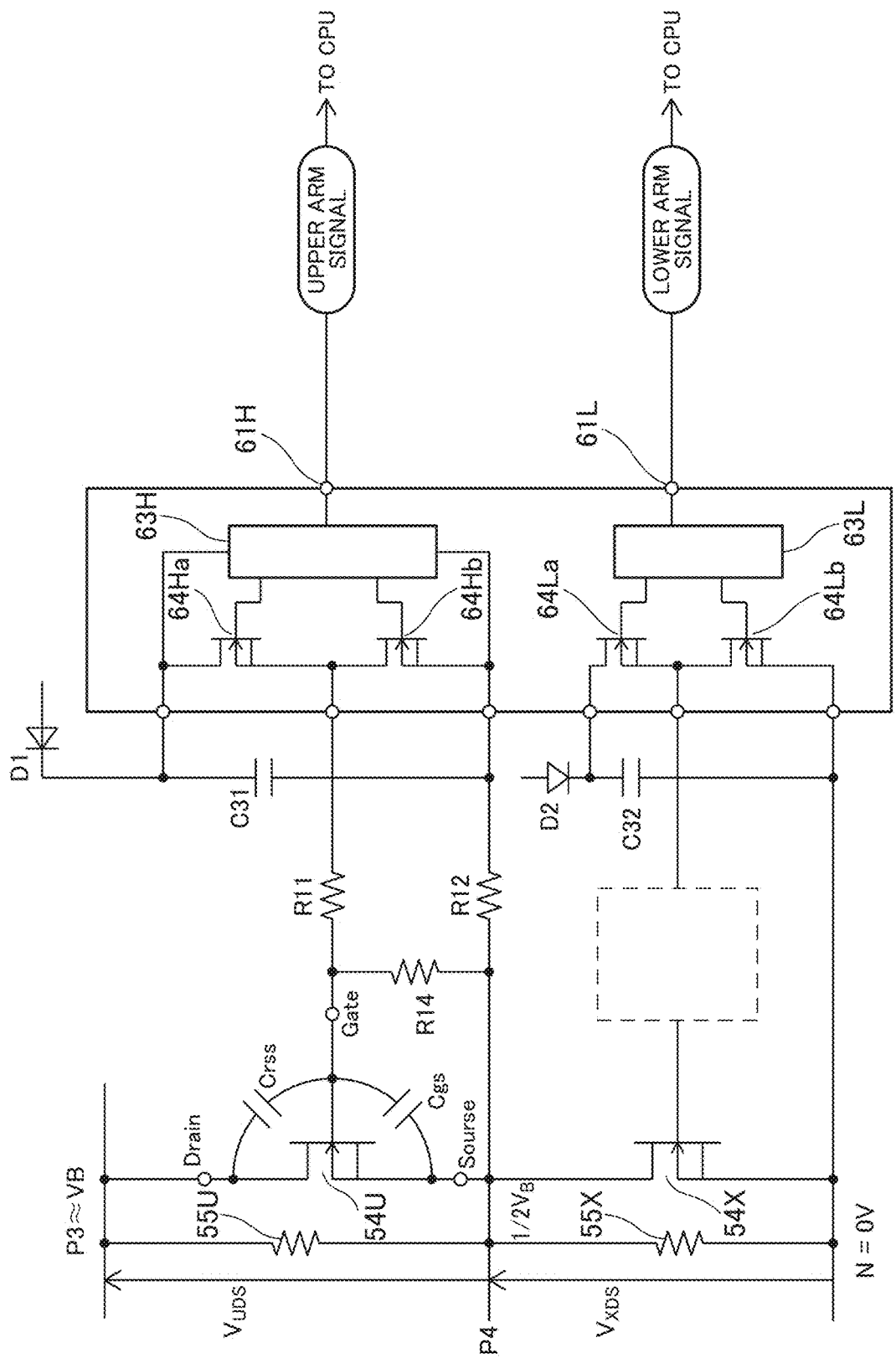
FIG. 5 is FET gate drive circuits illustrated by simplifying FIGS. 2 and 4 in order to explain a stray capacitance (or a parasitic capacitance) of each terminal of FET.
Figure 6:
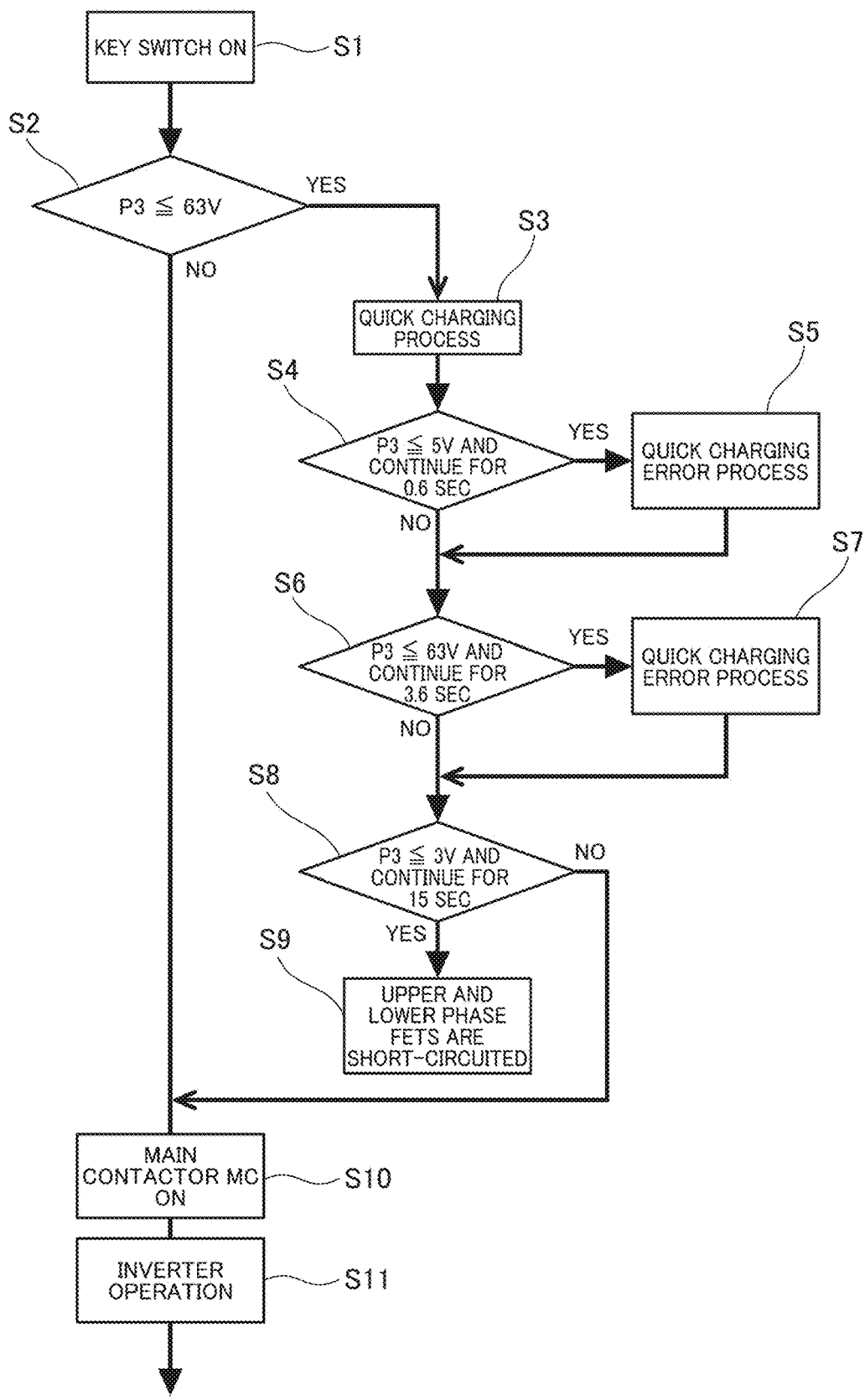
FIG. 6 is a flowchart of process of a conventional control device.
Figure 7:
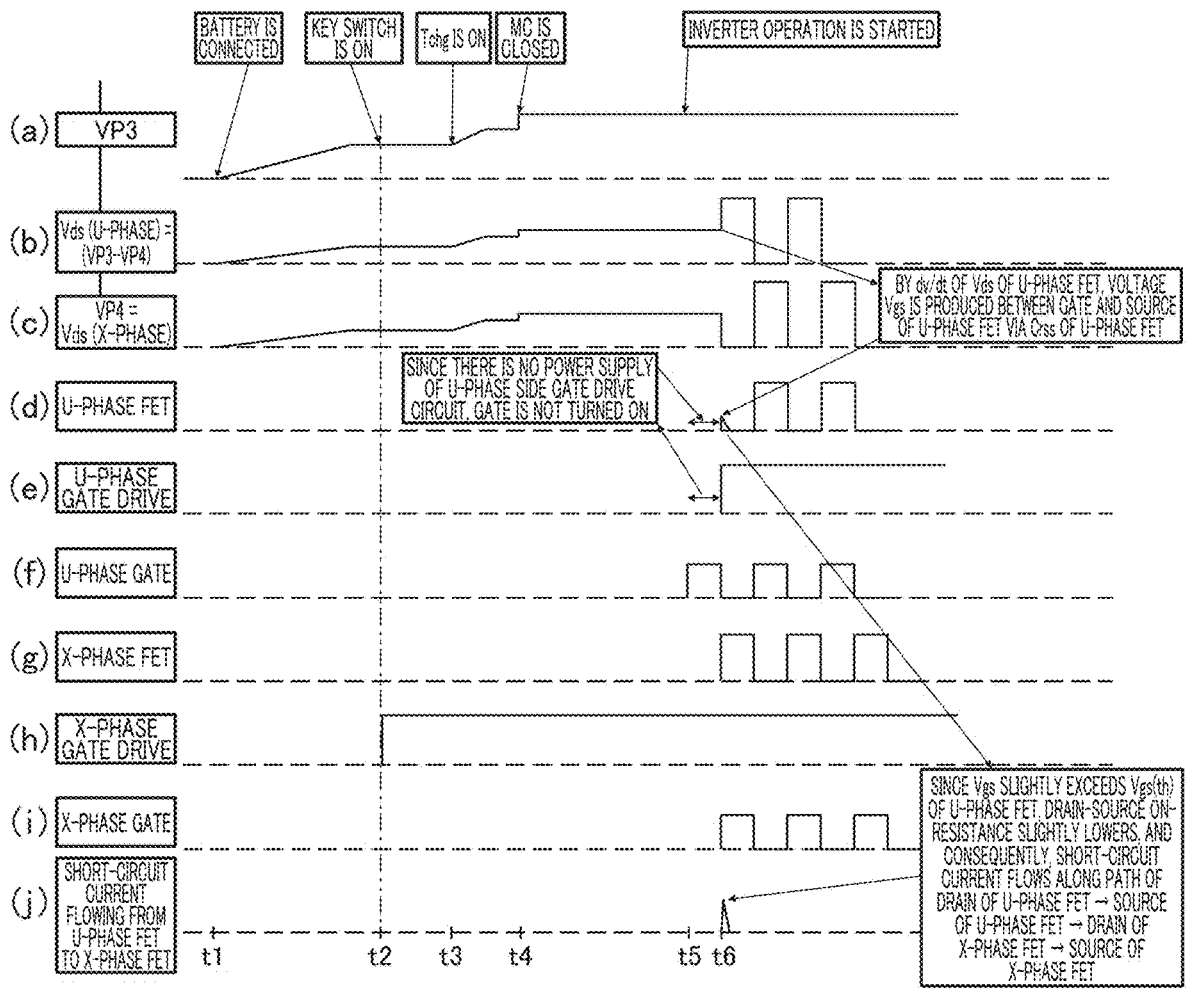
FIG. 7 is a time chart showing operation waveform of each part by the conventional process.

During a period for which the U-phase FET 54U is off and the X-phase FET 54X is on, since the voltage of the capacitor C31 is established, the upper phase (U-phase) side FET arm gate drive circuit (the high side totem-pole circuit of the HVIC 60 in FIG. 5) performs an OFF-output operation (sink-operation), and the gate-source voltage (charge of the input capacitance Cgs) of the U-phase FET 54U is discharged through the resistor R11, the lower side FET of the high side totem-pole circuit and the resistor R12 of FIG. 5. Therefore, voltage that exceeds the threshold value Vgs (th) of the gate-source voltage of the U-phase FET 54U is not generated, then the upper and lower arm short-circuit current, as shown at time t7 at which ON/OFF of the FETs of the U-phase and the X-phase is changed, does not flow.

Although FIG. 12 shows the time chart of only the set of upper and lower arms of the U-phase and the X-phase, the inverter has three sets of upper and lower arms of the U-phase and the X-phase, the V-phase and the Y-phase and the W-phase and the Z-phase, and these all show the operation as in FIG. 12.

As described above, according to the present embodiment, the applied voltage dv/dt between the drain and the source of the upper phase side FET, which is generated when the lower phase side FET is first ON-controlled (is first turned on), can be reduced.

With this, the charge (the electric charge) charged along the path of the drain-gate capacitance (Crss) of the upper phase side FET→the gate-source capacitance Cgs of the upper phase side FET is reduced, then the value of the gate-source voltage Vgs can be lowered. As a result, the malfunction of the short-circuit between the upper and lower phase arms can be prevented.

Further, since the charging voltage value of the electrolytic capacitor C21 in the precharging period is set by taking into consideration each stray capacitance (or each parasitic capacitance) in the state in which the FETs are mounted on the metal base substrate and by calculating the gate-source voltage of the upper phase side FET when an instantaneous voltage is applied between the drain and the source of the upper phase side FET, setting accuracy of the charging voltage value of the electrolytic capacitor can be increased, and erroneous failure detection can be avoided.

Next, a process of another embodiment of the present invention will be described. There is a case where after closing the main contactor 52 (after time t4 in FIG. 12) as in the process at step S36 in FIG. 10, the inverter operation is not performed for a while. In such a situation, OFF-operation of the upper phase side FET continues. That is, since the upper phase side FET gate drive circuit continues with a continuous operation, in order to recharge the upper phase (U-phase) side gate drive power supply capacitor (the capacitor C31) before a lapse of a certain time (time required for energy (the voltage of the capacitor C31) of the upper phase (U-phase) side gate drive power supply to be consumed/discharged and decreased), the lower phase side FET is made to be turned on for a short time. With this, since energy recharging of the upper phase (U-phase) side gate drive power supply capacitor (the capacitor C31) is performed, rise of Vgs of the FET caused by the fact that the gate drive circuit does not perform OFF-operation, which tends to occur at the beginning of the inverter operation, is prevented.

Figure 11:
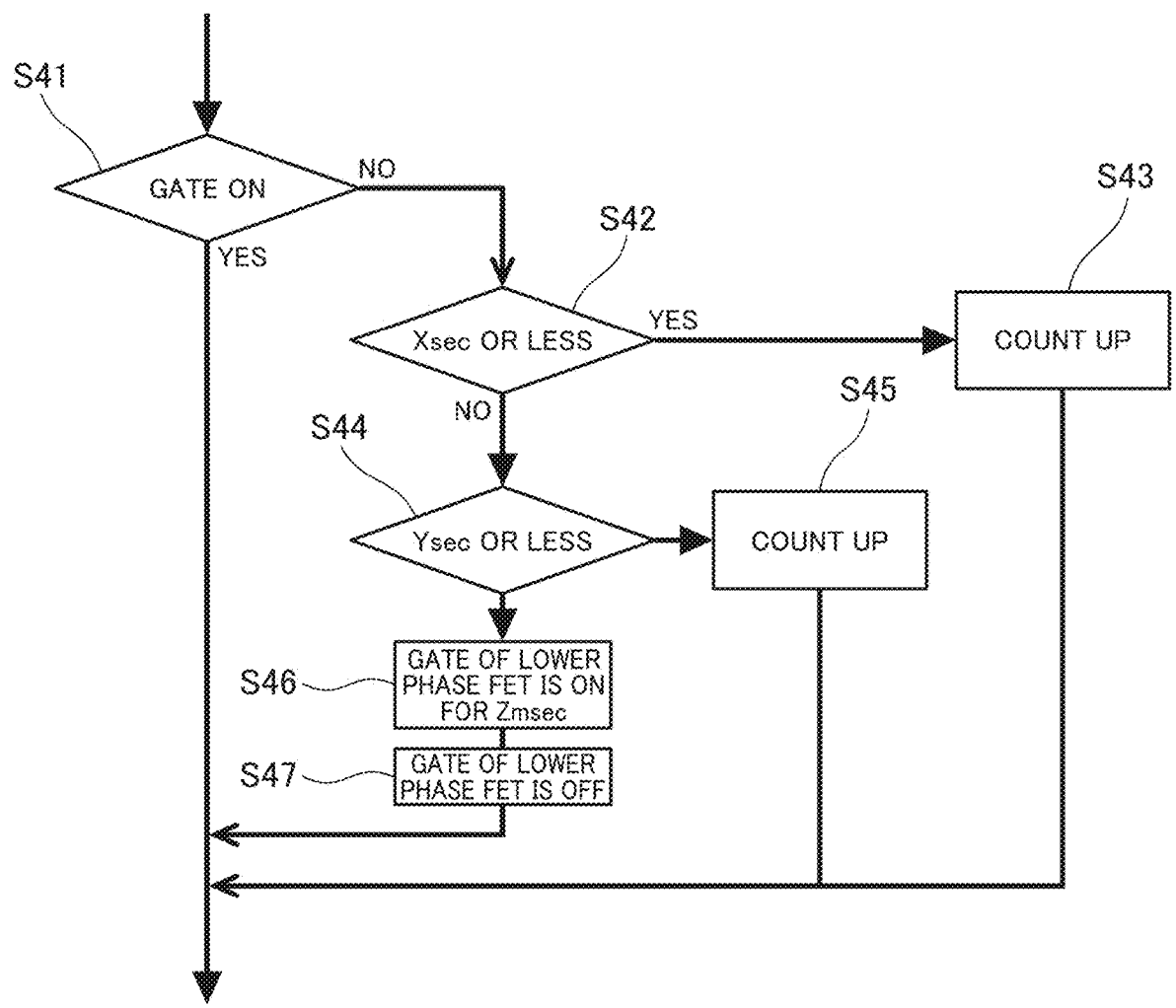
FIG. 11 is a flow chart of process of another embodiment of the present invention.

A flow chart of this process is shown in FIG. 11. FIG. 11 is a process executed during stop of the inverter operation while the main contactor 52 is closed. At step S41, a judgment is made as to whether or not the gate of the upper phase side FET (the U-phase FET 54U) is turned on. If the judgment result is NO, at step S42, a judgment is made as to whether or not the elapsed time is Xsec or less. If the judgment result of step S42 is YES, at step S43, a counter is incremented (count-up). If the judgment result of step S42 is NO, at step S44, a judgment is made as to whether or not the elapsed time is Ysec or less.

If the judgment result of step S44 is YES, at step S45, a counter is incremented (count-up). If the judgment result of step S44 is NO, at step S46, the gate of the lower phase side FET (the X-phase FET 54X) is ON-controlled (is controlled to be on) only for Zmsec, and after that, at step S47, the gate of the lower phase side FET (the X-phase FET 54X) is turned off.

If the judgment result of step S41 is YES or after the processes of steps S43, S45 or S47, the routine is returned to the first step S41, and the process of FIG. 11 is repeatedly executed.

According to the above embodiment, even in the case where the inverter operation is not performed for a while after closing the main contactor 52, since the upper phase side FET gate drive circuit power supply energy (the capacitor C31) is recharged by turning on the lower phase side FET at certain intervals, rise of Vgs of the FET caused by the fact that the gate drive circuit does not perform OFF-operation is suppressed, and the malfunction of the short-circuit between the upper and lower phase arms can be prevented.

The invention claimed is:

1. A control device of a power conversion device, the power conversion device including:
a power conversion unit in which an upper phase side FET and a lower phase side FET are bridge-connected between positive and negative electrode ends of a DC power supply;
an electrolytic capacitor connected to a series circuit of the upper phase side FET and the lower phase side FET of the power conversion unit in parallel;
a main contactor interposed on an electric path connecting the positive electrode end of the DC power supply and a positive electrode end of the electrolytic capacitor;
a first charging resistor connected to the main contactor in parallel for charging the electrolytic capacitor with a set charging time constant;
a series circuit of a charging FET connected to the first charging resistor in parallel and configured to be ON-controlled after a set time after a key switch is turned on and a second charging resistor set to a charging time constant that is shorter than that of the first charging resistor;
an upper phase side FET arm gate drive circuit configured to drive a gate of the upper phase side FET of the power conversion unit;
a lower phase side FET arm gate drive circuit configured to drive a gate of the lower phase side FET of the power conversion unit;
an upper phase side gate drive power supply capacitor configured to be charged when a gate power supply starts up by the turning-on of the key switch and also the lower phase side FET is ON-controlled, and served as a power supply of the upper phase side FET arm gate drive circuit; and
a lower phase side gate drive power supply capacitor configured to be charged when the gate power supply starts up by the turning-on of the key switch and served as a power supply of the lower phase side FET arm gate drive circuit, and the power conversion device configured so that the DC power supply is freely connectable and disconnectable, the control device configured so that a value of resistance of the first charging resistor is set so that in a precharging period until the key switch is turned on after the DC power supply is brought to a connecting state, when the upper phase side FET is controlled to be OFF and the lower phase side FET is controlled to be ON, a charge voltage value of the electrolytic capacitor is set so as to be able to limit a gate-source voltage of the upper phase side FET to voltage at which the upper phase side FET is not turned on, and the control device comprising:
a control unit configured so that when voltage of the electrolytic capacitor is the set charge voltage value after the key switch is turned on before the power conversion unit is operated, the lower phase side FET is controlled to be ON, then the upper phase side gate drive power supply capacitor is charged, and after the ON-control of the lower phase side FET, the charging FET is controlled to be ON, and further, when a potential difference between both ends of the main contactor becomes equal to or less than a set value, the main contactor is turned on, then operation of the power conversion unit is started.

2. The control device of the power conversion device as claimed in claim 1, wherein the charge voltage value of the electrolytic capacitor in the precharging period is set so that each parasitic capacitance generated between a metal base substrate and terminals of the upper phase side FET and the lower phase side FET of the power conversion unit when the upper phase side FET and the lower phase side FET are mounted on the metal base substrate is taken into consideration, and a voltage generated between the gate and a source of the upper phase side FET when an instantaneous voltage is applied between a drain and the source of the upper phase side FET is calculated, then a voltage value transiently applied to the gate-source voltage Vgs via each parasitic capacitance becomes low in a sufficiently large range as compared with a voltage value at which failure detection by continuation of low voltage between the drain and the source for a certain time is operated.

3. A method of controlling a power conversion device, the power conversion device including:

a power conversion unit in which an upper phase side FET and a lower phase side FET are bridge-connected between positive and negative electrode ends of a DC power supply;

an electrolytic capacitor connected to a series circuit of the upper phase side FET and the lower phase side FET of the power conversion unit in parallel;

a main contactor interposed on an electric path connecting the positive electrode end of the DC power supply and a positive electrode end of the electrolytic capacitor;

a first charging resistor connected to the main contactor in parallel for charging the electrolytic capacitor with a set charging time constant;

a series circuit of a charging FET connected to the first charging resistor in parallel and configured to be ON-controlled after a set time after a key switch is turned on and a second charging resistor set to a charging time constant that is shorter than that of the first charging resistor;

an upper phase side FET arm gate drive circuit configured to drive a gate of the upper phase side FET of the power conversion unit;

a lower phase side FET arm gate drive circuit configured to drive a gate of the lower phase side FET of the power conversion unit;

an upper phase side gate drive power supply capacitor configured to be charged when a gate power supply starts up by the turning-on of the key switch and also the lower phase side FET is ON-controlled, and served as a power supply of the upper phase side FET arm gate drive circuit; and a lower phase side gate drive power supply capacitor configured to be charged when the gate power supply starts up by the turning-on of the key switch and served as a power supply of the lower phase side FET arm gate drive circuit, and the power conversion device configured so that the DC power supply is freely connectable and disconnectable, the method comprising:

setting a value of resistance of the first charging resistor so that in a precharging period until the key switch is turned on after the DC power supply is brought to a connecting state, when the upper phase side FET is controlled to be OFF and the lower phase side FET is controlled to be ON, a charge voltage value of the electrolytic capacitor is set so as to be able to limit a gate-source voltage of the upper phase side FET to voltage at which the upper phase side FET is not turned on, and as a step by a control unit, when voltage of the electrolytic capacitor is the set charge voltage value after the key switch is turned on before the power conversion unit is operated, controlling the lower phase side FET to be ON, then charging the upper phase side gate drive power supply capacitor, and after the ON-control of the lower phase side FET, controlling the charging FET to be ON, and further, when a potential difference between both ends of the main contactor becomes equal to or less than a set value, turning on the main contactor, then start operation of the power conversion unit.

* * * * *